(12) United States Patent
Holoubek et al.

(10) Patent No.: US 12,520,744 B2
(45) Date of Patent: Jan. 13, 2026

(54) ON THE GO ORGANIC MATTER SENSOR AND ASSOCIATED SYSTEMS AND METHODS

(71) Applicant: Ag Leader Technology, Ames, IA (US)

(72) Inventors: Joe Holoubek, Ames, IA (US); Chad Swindoll, Sumner, MS (US); Aaron Friedlein, Farmersburg, IA (US); Roger Zielke, Huxley, IA (US)

(73) Assignee: Ag Leader Technology, Ames, IA (US)

( * ) Notice: Subject to any disclaimer, the term of this patent is extended or adjusted under 35 U.S.C. 154(b) by 815 days.

(21) Appl. No.: 16/684,877

(22) Filed: Nov. 15, 2019

(65) Prior Publication Data
US 2020/0154629 A1    May 21, 2020

Related U.S. Application Data

(60) Provisional application No. 62/767,896, filed on Nov. 15, 2018.

(51) Int. Cl.
*A01C 7/10*    (2006.01)
*A01G 24/20*    (2018.01)
(Continued)

(52) U.S. Cl.
CPC .............. *A01C 7/105* (2013.01); *A01G 24/20* (2018.02); *G06Q 10/06315* (2013.01); *G06Q 50/02* (2013.01)

(58) Field of Classification Search
CPC ........... A01C 7/105; A01C 7/102; A01C 7/10; A01C 7/08; A01C 7/00; A01G 24/20;
(Continued)

(56) References Cited

U.S. PATENT DOCUMENTS

| | | |
|---|---|---|
| 54,633 A | 5/1866 | Wilkinson |
| 605,348 A | 6/1898 | Schultz |

(Continued)

FOREIGN PATENT DOCUMENTS

| | | |
|---|---|---|
| AU | 2006203367 A1 | 2/2007 |
| AU | 2010201330 A1 | 3/2011 |

(Continued)

OTHER PUBLICATIONS

Kaspar, Tom & Colvin, Thomas & Jaynes, D.B. & Karlen, Douglas & James, David & Meek, David & Pulido, Daniel & Butler, Howard. (2003). Relationship Between Six Years of Corn Yields and Terrain Attributes. Precision Agriculture. 4. 87-101.

(Continued)

*Primary Examiner* — Christopher J. Novosad
(74) *Attorney, Agent, or Firm* — DENTON DAVIS BROWN PC; Matthew Warner-Blankenship; Kassandra Ricklefs

(57) ABSTRACT

An on-the-go planting system utilizing soil organic matter data to prescribed seeding rate, hybrid/variety selection or soil treatment. The system weights at least two field attribute data types, such as soil organic matter data and normalized yield data to prescribe one or more outcomes. The system can also generate a yield potential value so as to prescribe the outcomes.

21 Claims, 8 Drawing Sheets

(51) Int. Cl.
*G06Q 10/0631* (2023.01)
*G06Q 50/02* (2012.01)

(58) Field of Classification Search
CPC ........ A01G 24/00; G06Q 50/02; G06Q 50/00; G06Q 10/06315; G06Q 10/0631; G06Q 10/063; G06Q 10/06
See application file for complete search history.

(56) References Cited

U.S. PATENT DOCUMENTS

| | | |
|---|---|---|
| 1,178,765 A | 4/1916 | Waterman |
| 1,252,923 A | 1/1918 | Moench |
| 1,678,643 A | 7/1928 | Kassebeer |
| 1,731,356 A | 10/1929 | Smith |
| 2,357,760 A | 9/1944 | Peacock |
| 2,525,435 A | 10/1950 | White |
| 3,233,523 A | 2/1966 | Passaggio |
| 3,718,191 A | 2/1973 | Williams |
| 3,719,191 A | 3/1973 | Zimmerly |
| 3,749,035 A | 7/1973 | Cayton |
| 3,797,418 A | 3/1974 | Bridger |
| 3,844,357 A | 10/1974 | Ellinger |
| 4,167,910 A | 9/1979 | Pretzer |
| 4,193,458 A | 3/1980 | Long |
| 4,209,109 A | 6/1980 | Curl |
| 4,329,911 A | 5/1982 | Schwerin |
| 4,359,104 A | 11/1982 | Haapala |
| 4,417,530 A | 11/1983 | Kopecky |
| 4,596,200 A | 6/1986 | Gafford |
| 4,646,663 A | 3/1987 | Nikkel |
| 4,655,296 A | 4/1987 | Bourgault |
| 4,700,785 A | 10/1987 | Bartusek |
| 4,796,550 A | 1/1989 | Van Natta |
| 4,865,132 A | 9/1989 | Moore |
| 4,878,443 A | 11/1989 | Gardner |
| 4,913,070 A | 4/1990 | Morrison |
| 4,949,656 A | 8/1990 | Fyle |
| 4,986,782 A | 1/1991 | Severtson |
| 5,065,681 A | 11/1991 | Hadley |
| 5,069,779 A | 12/1991 | Brown |
| 5,074,227 A | 12/1991 | Schwitters |
| 5,103,924 A | 4/1992 | Walker |
| 5,163,518 A | 11/1992 | Foley |
| 5,170,909 A | 12/1992 | Lundie |
| 5,234,060 A | 8/1993 | Carter |
| 5,277,257 A | 1/1994 | Thompson |
| 5,366,024 A | 11/1994 | Payne |
| 5,427,182 A | 6/1995 | Winter |
| 5,479,992 A | 1/1996 | Bassett |
| 5,497,837 A | 3/1996 | Kehmey |
| 5,499,683 A | 3/1996 | Bassett |
| 5,529,128 A | 6/1996 | Peterson |
| 5,664,507 A | 9/1997 | Bergland |
| 5,709,271 A | 1/1998 | Bassett |
| 5,829,535 A | 11/1998 | Line |
| 5,842,248 A | 12/1998 | Stufflebeam et al. |
| 5,842,428 A | 12/1998 | Stufflebeam et al. |
| 5,862,764 A | 1/1999 | Umemoto |
| 5,936,234 A | 8/1999 | Thomas |
| 5,961,573 A * | 10/1999 | Hale ............. A01B 79/005 701/470 |
| 6,003,455 A | 12/1999 | Flamme |
| 6,013,020 A | 1/2000 | Meloul |
| 6,068,063 A | 5/2000 | Mayerle |
| 6,068,064 A | 5/2000 | Bettin |
| 6,091,997 A | 7/2000 | Flamme |
| 6,116,172 A | 9/2000 | Prairie |
| 6,325,156 B1 | 12/2001 | Barry |
| 6,378,619 B2 | 4/2002 | Mayerle |
| 6,389,999 B1 | 5/2002 | Duello |
| 6,460,623 B1 | 10/2002 | Knussman |
| 6,681,706 B2 | 1/2004 | Sauder et al. |
| 6,701,857 B1 | 3/2004 | Jensen |
| 6,748,885 B2 | 6/2004 | Sauder et al. |
| 6,827,029 B1 | 12/2004 | Wendte |
| 6,863,006 B2 | 3/2005 | Sandoval |
| 7,131,384 B2 | 11/2006 | Kester |
| 7,263,937 B2 | 9/2007 | Frasier |
| 7,334,532 B2 | 2/2008 | Sauder et al. |
| 7,395,767 B2 | 7/2008 | Sulman |
| 7,395,769 B2 | 7/2008 | Jensen |
| 7,478,603 B2 | 1/2009 | Riewerts |
| 7,540,246 B2 | 6/2009 | Friesen |
| 7,584,707 B2 | 9/2009 | Sauder |
| 7,673,570 B1 | 3/2010 | Bassett |
| 7,694,638 B1 | 4/2010 | Riewerts |
| 7,699,009 B2 | 4/2010 | Sauder et al. |
| 7,717,048 B2 | 5/2010 | Peterson, Jr. et al. |
| 7,870,826 B2 | 1/2011 | Bourgault |
| 7,938,074 B2 | 5/2011 | Liu |
| 7,980,186 B2 | 7/2011 | Henry |
| 8,020,657 B2 | 9/2011 | Allard |
| 8,056,465 B2 | 11/2011 | Carlz |
| 8,078,367 B2 | 12/2011 | Sauder |
| 8,275,525 B2 | 9/2012 | Kowalchuk |
| 8,275,627 B2 | 9/2012 | Henning |
| 8,286,566 B2 | 10/2012 | Schilling |
| 8,342,258 B2 | 1/2013 | Ryder |
| 8,346,442 B2 | 1/2013 | Ryder |
| 8,371,239 B2 | 2/2013 | Rans et al. |
| 8,418,636 B2 | 4/2013 | Liu et al. |
| 8,430,179 B2 | 4/2013 | Van Buskirk |
| 8,448,587 B2 | 5/2013 | Kowalchuk |
| 8,448,717 B2 | 5/2013 | Adams et al. |
| 8,451,449 B2 | 5/2013 | Holland |
| 8,479,671 B2 | 7/2013 | Shoup |
| 8,522,889 B2 | 9/2013 | Adams et al. |
| 8,544,397 B2 | 10/2013 | Bassett |
| 8,544,398 B2 | 10/2013 | Bassett |
| 8,550,020 B2 | 10/2013 | Sauder et al. |
| 8,561,472 B2 | 10/2013 | Sauder et al. |
| 8,573,111 B2 | 11/2013 | Graham |
| 8,634,992 B2 | 1/2014 | Sauder et al. |
| 8,636,077 B2 | 1/2014 | Bassett |
| 8,755,049 B2 | 6/2014 | Holland |
| 8,763,713 B2 | 7/2014 | Bassett |
| 8,770,308 B2 | 7/2014 | Bassett |
| 8,776,702 B2 | 7/2014 | Bassett |
| RE45,091 E | 8/2014 | Bassett |
| 8,814,474 B2 | 8/2014 | Bell |
| 8,850,998 B2 | 10/2014 | Garner |
| 8,863,857 B2 | 10/2014 | Bassett |
| 8,903,545 B2 | 12/2014 | Riffel |
| 8,909,436 B2 | 12/2014 | Achen |
| 8,910,582 B2 | 12/2014 | Mariman et al. |
| 8,924,092 B2 | 12/2014 | Achen |
| 8,924,102 B2 | 12/2014 | Sauder et al. |
| RE45,412 E | 3/2015 | Sauder et al. |
| 8,978,564 B2 | 3/2015 | Hagny |
| 8,985,037 B2 | 3/2015 | Radtke |
| 8,985,232 B2 | 3/2015 | Bassett |
| 9,055,712 B2 | 6/2015 | Bassett |
| 9,107,337 B2 | 8/2015 | Bassett |
| 9,107,338 B2 | 8/2015 | Bassett |
| 9,113,589 B2 | 8/2015 | Bassett |
| 9,119,342 B2 | 9/2015 | Bonefas |
| 9,137,938 B2 | 9/2015 | Zimmerman |
| 9,144,187 B2 | 9/2015 | Bassett |
| 9,144,189 B2 | 9/2015 | Stoller |
| 9,167,740 B2 | 10/2015 | Bassett |
| 9,173,339 B2 | 11/2015 | Sauder et al. |
| 9,192,089 B2 | 11/2015 | Bassett |
| 9,213,905 B2 | 12/2015 | Trimble |
| 9,226,440 B2 | 1/2016 | Bassett |
| 9,232,687 B2 | 1/2016 | Bassett |
| 9,265,191 B2 | 2/2016 | Sauder et al. |
| 9,288,937 B2 | 3/2016 | Sauder et al. |
| 9,301,438 B2 | 4/2016 | Sauder et al. |
| 9,332,689 B2 | 5/2016 | Baurer |
| 9,338,937 B2 | 5/2016 | Sauder et al. |
| 9,351,440 B2 | 5/2016 | Sauder et al. |
| 9,462,744 B2 | 10/2016 | Isaacson |
| 9,485,900 B2 | 11/2016 | Connell |

(56) References Cited

U.S. PATENT DOCUMENTS

| | | |
|---|---|---|
| 9,510,498 B2 | 12/2016 | Tuttle et al. |
| 9,523,496 B2 | 12/2016 | Bingham |
| 9,532,496 B2 | 1/2017 | Sauder et al. |
| 9,554,504 B2 | 1/2017 | Houck |
| 9,578,802 B2 | 2/2017 | Radtke |
| 9,585,301 B1 | 3/2017 | Lund |
| 9,629,304 B2 | 4/2017 | Zielke |
| 9,668,402 B2 | 6/2017 | Hagny |
| 9,675,004 B2 | 6/2017 | Landphair et al. |
| 9,681,601 B2 | 6/2017 | Bassett |
| 9,693,496 B2 | 7/2017 | Tevs |
| 9,699,958 B2 | 7/2017 | Koch |
| 9,723,778 B2 | 8/2017 | Bassett |
| 9,746,007 B1 | 8/2017 | Stoller |
| 9,750,174 B2 | 9/2017 | Sauder et al. |
| 9,752,596 B2 | 9/2017 | Sauder |
| 9,788,472 B2 | 10/2017 | Bassett |
| 9,801,332 B2 | 10/2017 | Landphair |
| 9,814,172 B2 | 11/2017 | Achen et al. |
| 9,848,522 B2 | 12/2017 | Bassett |
| 9,848,523 B2 | 12/2017 | Sauder |
| 9,854,733 B1 | 1/2018 | Kile |
| 9,879,702 B2 | 1/2018 | Stoller |
| 9,955,623 B2 | 5/2018 | Sauder et al. |
| 9,968,033 B2 | 5/2018 | Dunn |
| 10,045,477 B2 | 8/2018 | Hagny |
| 10,064,322 B2 | 9/2018 | Luc |
| 10,091,926 B2 | 10/2018 | Maro |
| 10,104,830 B2 | 10/2018 | Heathcote |
| 10,111,415 B2 | 10/2018 | Kolb |
| 10,143,128 B2 | 12/2018 | Landphair et al. |
| 10,231,376 B1 | 3/2019 | Stanhope |
| 10,257,973 B2 | 4/2019 | Hubner |
| 10,548,259 B2 | 2/2020 | Heathcote |
| 10,609,857 B2 | 4/2020 | Sauder |
| 10,645,865 B2 | 5/2020 | Bassett |
| 10,821,829 B2 | 11/2020 | Foster |
| 10,959,369 B2 | 3/2021 | Sieling |
| 11,144,775 B2 | 10/2021 | Ferrari |
| 11,197,411 B2 | 12/2021 | Bassett |
| 11,202,404 B2 | 12/2021 | Walter |
| 11,212,954 B2 | 1/2022 | Maeder |
| 11,277,961 B2 | 3/2022 | Campbell |
| 11,612,096 B2 | 3/2023 | Sivinski |
| 11,622,494 B2 | 4/2023 | Arnett et al. |
| 2002/0056407 A1 | 5/2002 | Milne |
| 2002/0073678 A1 | 6/2002 | Lucand |
| 2003/0005867 A1 | 1/2003 | Richard |
| 2003/0183141 A1 | 10/2003 | Bergere et al. |
| 2004/0139895 A1 | 7/2004 | Thompson et al. |
| 2005/0155536 A1 | 7/2005 | Wendte |
| 2005/0172873 A1 | 8/2005 | Mayerle |
| 2006/0086295 A1 | 4/2006 | Jensen |
| 2008/0110382 A1 | 5/2008 | Brockmeier |
| 2008/0229986 A1 | 9/2008 | Arksey |
| 2008/0257237 A1 | 10/2008 | Friesen |
| 2009/0056531 A1 | 3/2009 | Jessen |
| 2009/0056537 A1 | 3/2009 | Jessen |
| 2009/0112410 A1 | 4/2009 | Shull |
| 2010/0180808 A1 | 7/2010 | Liu |
| 2010/0192818 A1 | 8/2010 | Garner |
| 2010/0270043 A1 | 10/2010 | Ankenman |
| 2010/0319941 A1 | 12/2010 | Peterson |
| 2011/0027479 A1 | 2/2011 | Reineccius |
| 2011/0313575 A1 | 12/2011 | Kowalchuk |
| 2012/0042813 A1 | 2/2012 | Liu et al. |
| 2012/0046838 A1 | 2/2012 | Landphair et al. |
| 2012/0048159 A1 | 3/2012 | Adams et al. |
| 2012/0048160 A1 | 3/2012 | Adams |
| 2012/0151910 A1 | 6/2012 | Sauder |
| 2012/0186503 A1 | 7/2012 | Sauder |
| 2012/0261149 A1 | 10/2012 | Schmidt |
| 2012/0291680 A1 | 11/2012 | Rylander |
| 2013/0032363 A1 | 2/2013 | Curry et al. |
| 2013/0126430 A1 | 5/2013 | Kenley |
| 2013/0126460 A1 | 5/2013 | Furey |
| 2013/0248212 A1 | 9/2013 | Bassett |
| 2013/0333601 A1 | 12/2013 | Shivak |
| 2014/0026748 A1 | 1/2014 | Stoller |
| 2014/0060869 A1 | 3/2014 | Blunier |
| 2014/0116735 A1 | 5/2014 | Bassett |
| 2014/0190712 A1 | 7/2014 | Bassett |
| 2014/0214284 A1 | 7/2014 | Sauder et al. |
| 2014/0216771 A1 | 8/2014 | Bassett |
| 2014/0238284 A1 | 8/2014 | Kapphahn |
| 2014/0262378 A1 | 9/2014 | Connors |
| 2014/0303854 A1 | 10/2014 | Zielke |
| 2014/0379230 A1 | 12/2014 | Koch |
| 2015/0094916 A1 | 4/2015 | Bauerer et al. |
| 2015/0107501 A1 | 4/2015 | Barton |
| 2015/0176614 A1 | 6/2015 | Stoller |
| 2015/0195988 A1 | 7/2015 | Radtke |
| 2015/0264857 A1 | 9/2015 | Achen |
| 2015/0271986 A1 | 10/2015 | Sauder et al. |
| 2015/0305229 A1 | 10/2015 | Sauder |
| 2015/0319919 A1 | 11/2015 | Sauder |
| 2016/0007521 A1 | 1/2016 | Kusler |
| 2016/0007524 A1 | 1/2016 | Kusler |
| 2016/0040692 A1 | 2/2016 | Stoller |
| 2016/0128272 A1 | 5/2016 | Sauder |
| 2016/0143213 A1 | 5/2016 | Kowalchuk |
| 2016/0157412 A1 | 6/2016 | Sauder |
| 2016/0212932 A1 | 7/2016 | Radtke |
| 2016/0227700 A1 | 8/2016 | Wendte |
| 2016/0227701 A1 | 8/2016 | Nelson |
| 2016/0249525 A1 | 9/2016 | Baurer et al. |
| 2017/0000016 A1 | 1/2017 | Prickel |
| 2017/0013771 A1 | 1/2017 | Townsend |
| 2017/0049044 A1 | 2/2017 | Stoller |
| 2017/0086347 A1 | 3/2017 | Sauder |
| 2017/0094889 A1 | 4/2017 | Garner |
| 2017/0112043 A1 | 4/2017 | Nair |
| 2017/0223947 A1 | 8/2017 | Gall |
| 2017/0280616 A1 | 10/2017 | Gervais |
| 2017/0354079 A1 | 12/2017 | Foster |
| 2017/0357029 A1* | 12/2017 | Lakshmanan .......... G06Q 10/04 |
| 2017/0359941 A1 | 12/2017 | Czapka |
| 2017/0367252 A1 | 12/2017 | Sakaguchi |
| 2018/0015490 A1 | 1/2018 | Grimm |
| 2018/0024549 A1 | 1/2018 | Hurd |
| 2018/0092287 A1 | 4/2018 | Garner |
| 2018/0092288 A1 | 4/2018 | Garner |
| 2018/0092289 A1 | 4/2018 | Wonderlich |
| 2018/0092295 A1 | 4/2018 | Sugumaran |
| 2018/0125000 A1 | 5/2018 | Levy |
| 2018/0128933 A1 | 5/2018 | Koch |
| 2018/0132422 A1 | 5/2018 | Hassanzadeh et al. |
| 2018/0132423 A1* | 5/2018 | Rowan ................. A01C 21/005 |
| 2018/0168094 A1 | 6/2018 | Koch |
| 2018/0169094 A1 | 6/2018 | Koch |
| 2018/0199499 A1 | 7/2018 | Adams |
| 2018/0199505 A1 | 7/2018 | Beaujot |
| 2018/0206393 A1 | 7/2018 | Stoller |
| 2018/0210443 A1 | 7/2018 | Matsuzaki |
| 2018/0263174 A1 | 9/2018 | Hodel |
| 2018/0292339 A1 | 10/2018 | Gunzenhauser |
| 2018/0317380 A1 | 11/2018 | Bassett |
| 2018/0317381 A1 | 11/2018 | Bassett |
| 2018/0368310 A1 | 12/2018 | Zimmerman |
| 2018/0373264 A1 | 12/2018 | Madsen |
| 2019/0021211 A1 | 1/2019 | Gutknecht |
| 2019/0029165 A1 | 1/2019 | Leimkuehler et al. |
| 2019/0045703 A1 | 2/2019 | Bassett |
| 2019/0059206 A1 | 2/2019 | Stanhope |
| 2019/0072114 A1 | 3/2019 | Myers et al. |
| 2019/0075714 A1 | 3/2019 | Koch |
| 2019/0124824 A1 | 5/2019 | Hubner et al. |
| 2019/0162164 A1 | 5/2019 | Funk |
| 2019/0174666 A1 | 6/2019 | Mantemach |
| 2019/0191622 A1 | 6/2019 | Hafvenstein |
| 2019/0232304 A1 | 8/2019 | Grimm |
| 2019/0239413 A1 | 8/2019 | DeGarmo |
| 2019/0254223 A1 | 8/2019 | Eichhorn |
| 2019/0286915 A1 | 9/2019 | Patil |

(56) References Cited

U.S. PATENT DOCUMENTS

| | | |
|---|---|---|
| 2019/0289778 A1 | 9/2019 | Koch |
| 2019/0297769 A1 | 10/2019 | Zielke et al. |
| 2019/0297774 A1 | 10/2019 | Hamilton |
| 2019/0302799 A1 | 10/2019 | Schaff |
| 2019/0373801 A1 | 12/2019 | Schoeny |
| 2019/0380259 A1 | 12/2019 | Frank |
| 2019/0387662 A1 | 12/2019 | Viriat |
| 2020/0029486 A1 | 1/2020 | Buehler et al. |
| 2020/0045869 A1 | 2/2020 | Stanhope |
| 2020/0053954 A1 | 2/2020 | Hamilton |
| 2020/0068778 A1 | 3/2020 | Schoeny |
| 2020/0068783 A1 | 3/2020 | Strnad |
| 2020/0100418 A1 | 4/2020 | Komecki |
| 2020/0100419 A1 | 4/2020 | Stanhope |
| 2020/0100421 A1 | 4/2020 | Wang |
| 2020/0109954 A1 | 4/2020 | Li |
| 2020/0128723 A1 | 4/2020 | Eichhorn |
| 2020/0154627 A1 | 5/2020 | Plattner |
| 2020/0154629 A1 | 5/2020 | Holoubek et al. |
| 2020/0178455 A1 | 6/2020 | Ishikawa |
| 2020/0217044 A1 | 7/2020 | Martel |
| 2020/0221630 A1 | 7/2020 | Pomedli |
| 2020/0296882 A1 | 9/2020 | Madison |
| 2020/0305335 A1 | 10/2020 | Schoeny |
| 2020/0329631 A1 | 10/2020 | Johnson |
| 2020/0337218 A1 | 10/2020 | Puhalla |
| 2020/0352088 A1 | 11/2020 | Arnett |
| 2020/0359559 A1 | 11/2020 | Koch |
| 2020/0375081 A1 | 12/2020 | Holoubek |
| 2020/0375085 A1 | 12/2020 | Strnad |
| 2020/0375090 A1 | 12/2020 | Morgan |
| 2021/0022286 A1 | 1/2021 | Gilbert et al. |
| 2021/0051846 A1 | 2/2021 | Vandenbark |
| 2021/0059102 A1 | 3/2021 | Geistkemper |
| 2021/0120726 A1 | 4/2021 | Barrick |
| 2021/0132618 A1 | 5/2021 | Van Roekel |
| 2021/0153421 A1 | 5/2021 | Holoubek et al. |
| 2021/0161060 A1 | 6/2021 | Kaufmann |
| 2021/0185903 A1 | 6/2021 | Demiter et al. |
| 2021/0235611 A1 | 8/2021 | Fett |
| 2021/0243939 A1 | 8/2021 | Strnad |
| 2021/0243941 A1 | 8/2021 | Buehler |
| 2021/0307236 A1 | 10/2021 | Strnad |
| 2021/0315147 A1 | 10/2021 | Fanshier |
| 2022/0000008 A1 | 1/2022 | Hubner |
| 2022/0061202 A1 | 3/2022 | Holoubek et al. |
| 2022/0061208 A1 | 3/2022 | Campbell et al. |
| 2022/0142039 A1 | 5/2022 | Eichhorn et al. |
| 2022/0151138 A1 | 5/2022 | Barry |
| 2022/0174855 A1 | 6/2022 | Zielke et al. |
| 2022/0232753 A1 | 7/2022 | Van De Woestyne |
| 2022/0272888 A1 | 9/2022 | Hodel |
| 2022/0369534 A1 | 11/2022 | Nikolakakis |
| 2023/0145955 A1 | 5/2023 | Schmidt et al. |
| 2023/0180653 A1 | 6/2023 | Barry et al. |
| 2023/0232733 A1 | 7/2023 | Barry |
| 2023/0388458 A1 | 11/2023 | Eichhorn et al. |
| 2023/0413720 A1 | 12/2023 | Barry et al. |
| 2024/0167848 A1 | 5/2024 | Johnson |
| 2024/0180066 A1 | 6/2024 | Holoubek |
| 2024/0334864 A1 | 10/2024 | Holoubek et al. |
| 2025/0133977 A1 | 5/2025 | Barry et al. |
| 2025/0348988 A1 | 11/2025 | Eichhorn |

FOREIGN PATENT DOCUMENTS

| | | |
|---|---|---|
| AU | 2017382800 B2 | 6/2018 |
| AU | 2018100865 B4 | 6/2022 |
| CA | 2346724 A1 | 4/2000 |
| CA | 2549371 A1 | 11/2007 |
| CA | 2584736 A1 | 9/2008 |
| CA | 2727188 A1 | 12/2009 |
| CN | 108362267 | 8/2018 |
| CN | 112601450 | 4/2021 |
| EP | 372901 A2 | 6/1990 |
| EP | 606541 | 1/1997 |
| EP | 3219186 A1 | 9/2017 |
| EP | 2901838 B1 | 11/2017 |
| EP | 3698615 A1 | 8/2020 |
| GB | 18381 | 10/1904 |
| GB | 2309622 A | 6/1997 |
| JP | 4517467 | 8/2010 |
| KR | 101728137 | 4/2017 |
| KR | 101728137 B1 | 4/2017 |
| RU | 2355152 | 5/2009 |
| SU | 948316 | 8/1982 |
| SU | 1148582 | 4/1985 |
| WO | 2009134144 A1 | 11/2009 |
| WO | 2014153157 A1 | 9/2014 |
| WO | 2015171908 A1 | 11/2015 |
| WO | 2017160860 A1 | 9/2017 |
| WO | 2017197274 A1 | 11/2017 |
| WO | 2017197292 | 11/2017 |
| WO | 2018151989 | 8/2018 |
| WO | 2021021594 | 2/2021 |
| WO | 2021231159 A1 | 11/2021 |

OTHER PUBLICATIONS

Zimmerman Manufacturing LLC "Contour King St Gallery".
Zimmerman Manufacturing LLC "Contour King St" Zimmerman Manufacturing Equipment.
Precision Planting "FurrowForce" https://www.precisionplanting.com/products/product/furrowforce.
Precision Planting "FurrowJet" https://www.precisionplanting.com/products/product/furrowjet.
Kasper et al. "Relationship Between Six Years of Corn Yields and Terrain Attributes." 2003, Precision Agriculture vol. 4, pp. 87-101.
Orthman "1tRIPr Precision Tillage System" Brochure.
Deere "SeedStar XP Monitor for Planters" pp. 70-78-70-9.
ZML Contour King—YouTube Video—https://www.youtube.com/watch?v=T-rj_EZMCM4.
Dawn Equipment—Twitter Video—https://twitter.com/DawnEquipment/status/969698839409111045.
Modular Row Crop Planting Systems from Excel Agriculture, available as early as 2002—https://www.excelagr.com.au/excel-agri-row-crop-planter.php.
Janke Australia, available as early as 2017—https://www.janke.com.au/.
Patriot Parallelogram Tyne Planter Farm Equipment Gessner, available as early as 2017—https://www.gessner.com.au/products/patriot-parallelogram-tyne-planter/.
Ground Breaker Precision Planters and Patented Tyne and Disc Row Units—https://www.precisionagsolutions.com.au/ground-breaker.
Parallelogram Tyne Units—https://bossagriculture.com.au/home/planter-row-units/parallelogram-tyne-units/.
What to Look for in a No Till or Minimum Tillage Planter—https://multifarmingsystems.com.au/wp-content/ uploads/2015/07/What-to-Look-for-in-a-No-Till-or-Minimum-Tillage-Planter.pdf.
Boss 18 Metre Parallelogram Tyne Planter—https://www.thecombineforum.com/threads/boss-18-metre-parallelogram-tyne-planter-on-9-spacing.222722/.
Precision tyne planter takes innovation award, 2017, https://www.graincentral.com/machinery/precision-tyne-planter-takes-innovation-award.
360 Yield Sensor—Wave.
8910 Floating Hitch Cultivator, available as early as 2010—https://www.bourgault.com/en-us/products/tillage/8910- cultivator.
Enfield Technologies, EQV Proportional Pinch Valves, https://www.enfieldtech.com/Products/EQV-Proportional-Pinch-Valves.
Farm Equipment—ZML.
Industrial Electronics Robust control of active suspensions for high performance vehicles, 1996.
Industrial electronics, modeling and force tracking control of hydraulic actuator for an active suspension system, 2006.
John Deere Delta Force Diagram.
Manitoba, design of a spring-loaded downforce system for a no-till seed opener, 2003.

(56) References Cited

OTHER PUBLICATIONS

Minesweeping Tank, Electrohydraulic System Using RBF Neural Network and Genetic Algorithm, 2010.
Precision Planting 2010 Full Line Brochure.
Page 130 of version 5.2 Operating Manual for the Ag Leader Integra, Part No. 4002083.

\* cited by examiner

| Field Attributes | | Normalized | | Additional | Additional |
|---|---|---|---|---|---|
| Yield Potential | 0% | Yield Rating | Terrain Type | Attribute 1 | Attribute N |
| 1 | 0-1% | 0-80% | Depression | X | Y |
| 2 | 1-2% | 90-100% | Ridge | X | Y |
| 3 | 2-3% | 100-110% | Plain | X | Y |
| 4 | 3-4% | 110+% | Side Slope | X | Y |
| Weight (0-100) | 70 | 30 | 60 | 50 | 50 |
| Include (1 or 0) | 1 | 1 | 1 | 0 | 0 |

| Area of Field | | | | |
|---|---|---|---|---|
| Attribute | Data Input | Yield Potential | Weight | |
| OM% | 2-3% | 3 | 70 | 1.3125 |
| Normalized Yield | 110% | 4 | 30 | 0.75 |
| Terrain Type | Side Slope | 4 | 60 | 1.5 |
| Additional 1 | X | 2 | 0 | 0 |
| Additional N | Y | 2 | 0 | 0 |
| | | | Weighted Zone | (3.5625) |

| Example Prescribed Outputs | | | | |
|---|---|---|---|---|
| Zone | Population | Hybrid | Soil Treatment | Population Trial? |
| 1 | 28000 | 1 | A | No |
| 2 | 32000 | 1 | B | No |
| 3 | 36000 | 2 | C | Yes |
| 4 | 40000 | 2 | D | Yes |
| 0.4375 | 1750 | | | |
| 3.5626 | (38250) | | | |

ON THE GO ORGANIC MATTER SENSOR AND ASSOCIATED SYSTEMS AND METHODS

CROSS-REFERENCE TO RELATED APPLICATION(S)

This application claims the benefit under 35 U.S.C. § 119(e) to U.S. Provisional Application 62/767,896, filed Nov. 15, 2018, and entitled On-the-go Organic Matter Sensor and Associated Systems and Methods, which is hereby incorporated herein by reference in its entirety for all purposes.

TECHNICAL FIELD

The disclosed devices, systems, and methods relate generally to devices, systems, and methods for use in agricultural planting such as high-speed planting, and in particular to devices, methods, and systems for determining variable seeding rates and/or soil treatments in real time. This has implications for high speed, high yield planting of corn, beans, and other agricultural crops.

BACKGROUND

The amount of organic matter in soil varies across a field and the amount of organic matter in the soil can affect the yield. High levels of organic matter in soil are indicative of higher yield potential, while low levels of organic matter in soil are indicative of lower yield potential. As yield potential changes the seeding rate should also change in kind to maximize yield throughout a field.

Current methods for variable rate seeding require soil testing and creation of a map prior to planting. These currently known methods are time intensive and must be done prior to planting.

There is a need in the art for improved devices, systems, and methods for real time, automatic prescription of variable rate seeding and soil treatment.

BRIEF SUMMARY

Disclosed herein are various devices, systems, and methods related to determining variable seeding rates and/or soil treatments in real time during agricultural planting.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Example 1 relates to implementations for a variable rate on-the-go prescription planting system, including a soil sensor constructed and arranged to record soil organic matter data, a processor constructed and arranged to weight the recorded soil organic matter data with one or more additional field attribute data type to determine a yield potential, and a seed meter having a seeding rate, where the processor is constructed and arranged to prescribe the seed meter seeding rate in response to the determined yield potential. Certain implementations of this Example include corresponding computer systems, apparatus, and computer programs recorded on one or more computer storage devices, each configured to perform the actions of the methods.

Implementations may include one or more of the following features. The system where the processor weights on the basis of user inputs. The system where the additional field attribute data is selected from the group including of normalized yield data, terrain data and geo-spatial data. The system where the processor is constructed and arranged to prescribe a seed variety/hybrid or a soil treatment. The system where the processor is in operational communication with a database. The system further including a display. The system where the processor is constructed and arranged to overlap maps on the display. Implementations of the described system implementations may include hardware, a method or process, or computer software on a computer-accessible medium.

Example 2 is directed to a variable rate on-the-go prescription planting system, including a row unit, and a processor constructed and arranged to weight two or more field attribute data types, and determine yield potential, wherein the processor is further constructed and arranged to prescribe at least one of seed variety/hybrid, seeding rate and soil treatment to be applied by the row unit. Other implementations of this Example include corresponding computer systems, apparatus, and computer programs recorded on one or more computer storage devices, each configured to perform the actions of the methods.

Implementations according to this Example may include one or more of the following features. The variable rate on-the-go prescription planting system where the two or more field attribute data types are selected from the group including of organic matter data, normalized yield data, terrain data and geo-spatial data. The variable rate on-the-go prescription planting system where the processor is constructed and arranged to determine weighted yield attribute scores. The variable rate on-the-go prescription planting system where the processor is constructed and arranged to calculate a weighted yield potential from the weighted yield attribute scores. The variable rate on-the-go prescription planting system where the processor is constructed and arranged to prescribe the output via the weighted yield potential. The variable rate on-the-go prescription planting system further including a display, where the processor is further constructed and arranged to generate overlay maps on the display. The variable rate on-the-go prescription planting system processor is constructed and arranged to locate population trials. The variable rate on-the-go prescription planting system further including storage media, where the processor is constructed and arranged to adjust weighting via machine learning. Implementations of the described techniques may include hardware, a method or process, or computer software on a computer-accessible medium.

Example 3 includes a variable rate on-the-go prescription planting system, including a planting row unit including a seed meter, and a processor in operational communication with the seed meter and constructed and arranged to weight two or more field attribute data types, and determine yield potential, where the processor is further constructed and arranged to prescribe at least one of seed variety/hybrid, seeding rate and soil treatment to be applied by the row unit. Other embodiments of this Example include corresponding computer systems, apparatus, and computer programs recorded on one or more computer storage devices, each configured to perform the actions of the methods.

While multiple embodiments are disclosed, still other embodiments of the disclosure will become apparent to those skilled in the art from the following detailed description, which shows and describes illustrative embodiments of the invention. As will be realized, the disclosure is capable of modifications in various obvious aspects, all without departing from the spirit and scope of the disclosure. Accordingly, the drawings and detailed description are to be regarded as illustrative in nature and not restrictive.

BRIEF DESCRIPTION OF THE DRAWINGS

FIG. 4B is a table showing system weighting, according to an exemplary implementation of the system.

FIG. 4C is a table showing weighting calculations according to the implementation of FIG. 4B.

FIG. 4D is a table showing a prescribed seeding rate according to the weighted calculations of FIG. 4C.

DETAILED DESCRIPTION

The various implementations disclosed herein relate to technologies for real time adjustments to variable seeding rates, hybrid selection, and/or soil treatment during agricultural processes, such as planting. In certain implementations, the system is an on-the-go, active, multi-factor variable rate prescription system. In various implementations, the system is used in conjunction with both a soil sensor that may be constructed and arranged to assess soil qualities such as organic matter and another augmenting data type, such as normalized yield to adjust the rate of seeding, hybrid selection and/or soil treatment. In various implementations, the organic matter measurements and augmenting data values are weighted to prescribe the seeding rate on-the-go.

Accordingly, the implementations disclosed herein relate to systems, methods and devices for real-time monitoring of soil organic matter and other augmenting data for the prescription of variable rate seeding and/or variation of alternative planting parameters, or, for brevity, an on-the-go planting system or system. While the term "system" may be used, it is in no way intended to limit the scope of the disclosed implementations.

The various implementations of the system disclosed herein can be incorporated into and/or used with various other known devices, systems, and methods. For example, various implementations of the system may be incorporated with the disclosures of U.S. patent application Ser. No. 16/523,343, filed on Jul. 26, 2019, entitled "Closing Wheel Downforce Adjustment Devices, Systems, And Methods," U.S. patent application Ser. No. 16/142,522, filed on Sep. 26, 2018, entitled "Planter Downforce and Uplift Monitoring and Control Feedback Devices, Systems, and Associated Methods," which are hereby incorporated by reference in their entirety.

Figure 1:
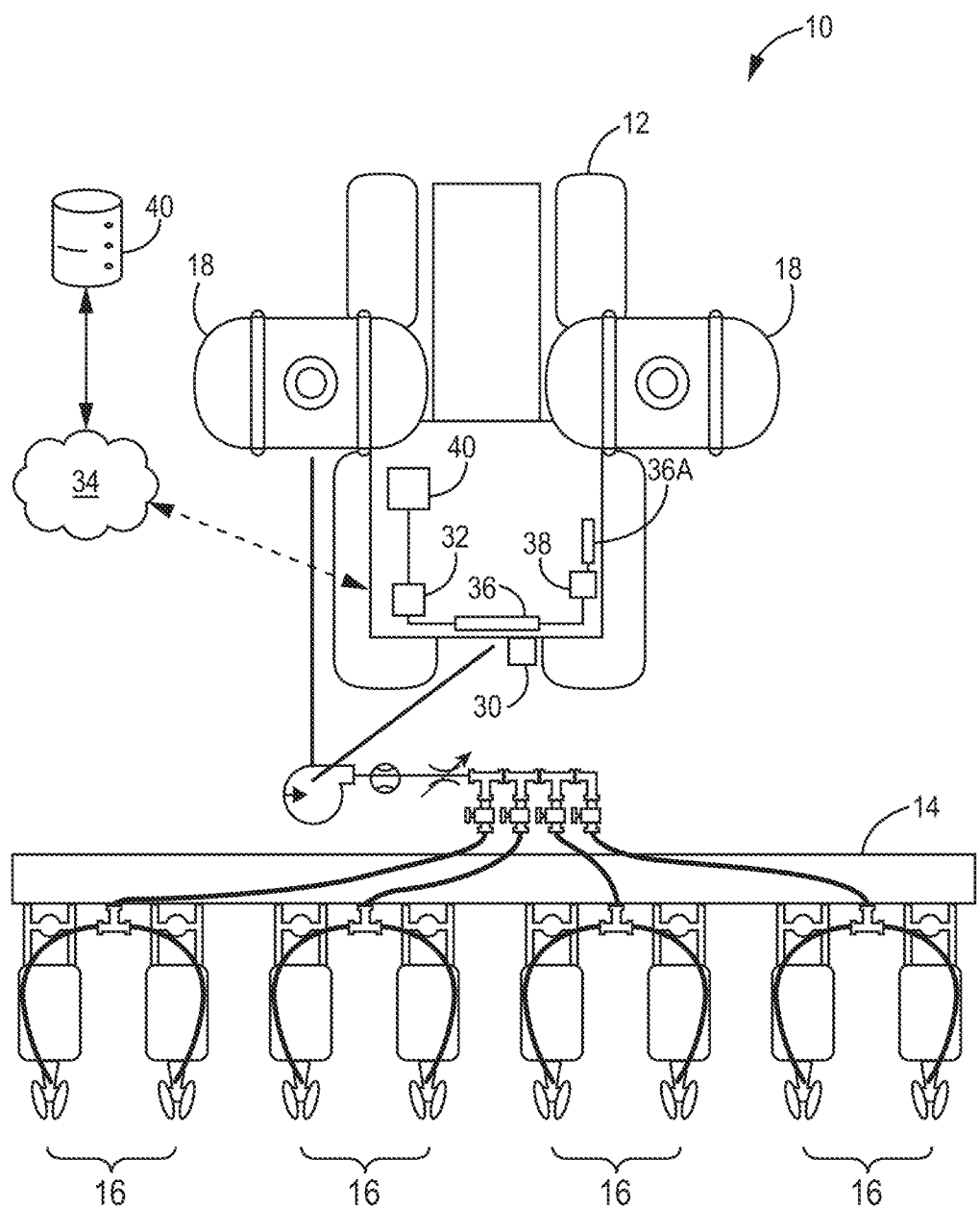
FIG. 1 is a top view of a tractor and planter having row units according to an exemplary implementation of the system.
Figure 2:
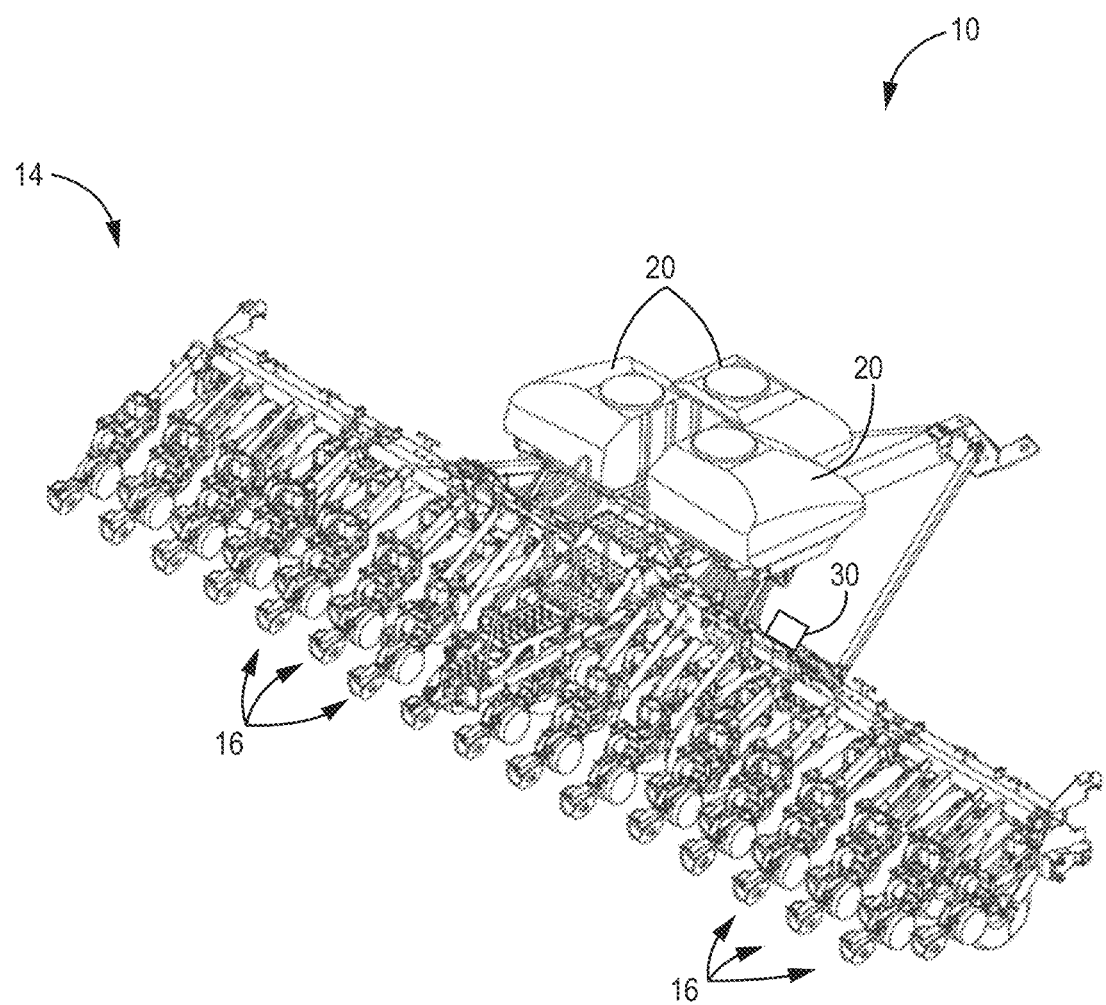
FIG. 2 is a three-quarters perspective view of a planter with row units, according to an exemplary implementation of the system.

Turning to the figures in greater detail, FIGS. 1-3 depict various implementations of the augmented on-the-go system 10. FIG. 1 shows an exemplary tractor 12 with an attached planter 14; FIG. 2 shows another exemplary planter 14; and FIG. 3 shows an exemplary row unit 16, each for use with the disclosed system 10. In various implementations, the planter 14 includes a plurality of row units 16, as has been previously described. It is readily appreciated that the system 10 according to various implementations can be incorporated into any known row unit 16 having any configuration, and that any such row unit 16 can be incorporated into any known seeding machine.

In certain implementations like those depicted in FIGS. 1-3B, the system 10 includes one or more liquid reservoirs 18. In various of these implementations, the liquid reservoirs 18 store various chemicals, such as fertilizer, for application to the soil 2 during planting. In further implementations, the system 10 includes one or more seed hoppers 20. In various implementations, the liquid reservoir(s) 18 and/or seed hopper(s) 20 are disposed on the tractor 12, planter 14, and/or row units 16 and constructed and arranged to plant seed and/or apply treatments such as pesticide, herbicide or the like at prescribed rates, as would be readily appreciated.

Figure 3A:
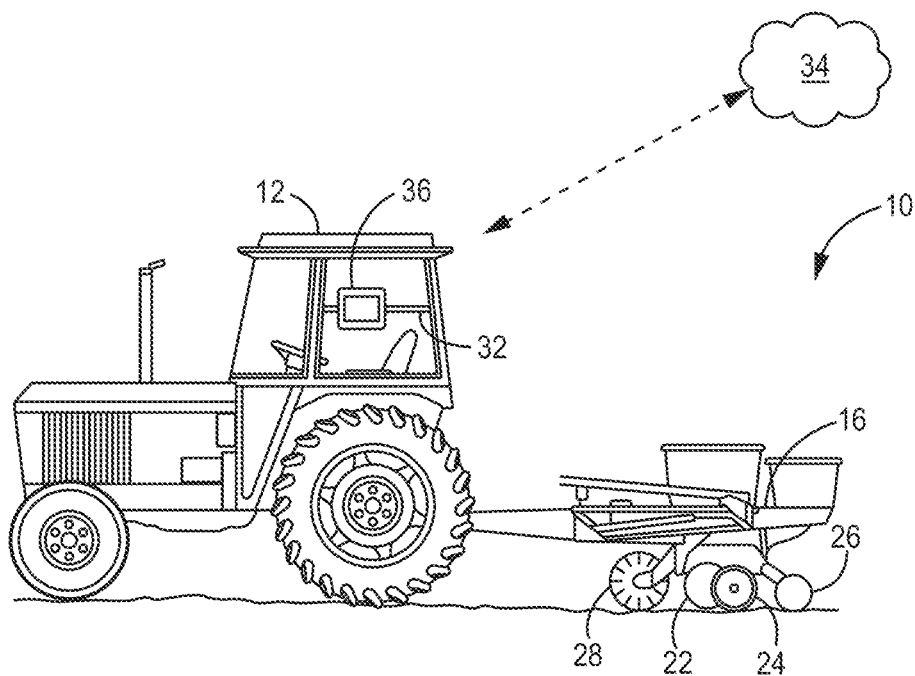
FIG. 3A is a side view of a tractor and planter with a row unit according to an exemplary implementation of the system.
Figure 3B:
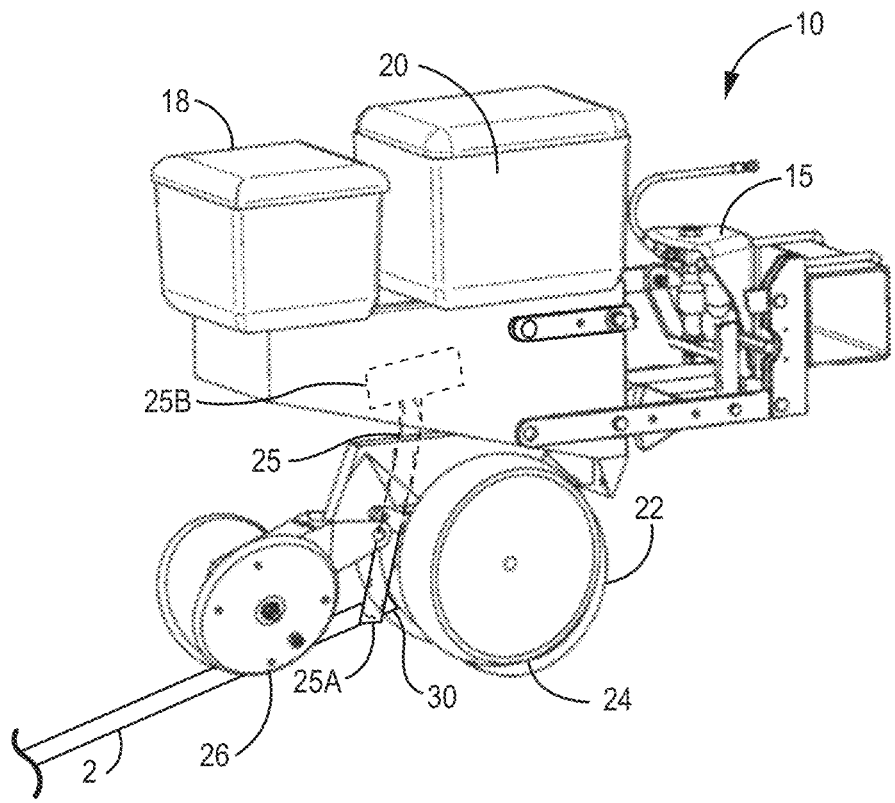
FIG. 3B is a three-quarters perspective view of the row unit of FIG. 3A showing a detailed view of various components of the system.

As shown best in FIGS. 3A-3B, the row units 16 of various implementations may include a variety of features, including but not limited to: a supplemental downforce system 15, liquid reservoirs 18 and/or seed hopper 20, opening discs 22, gauge wheels 24, closing wheels 26, row cleaners 28 and the like. In some implementations, each row unit 16 includes both a liquid reservoir 18 and a seed reservoir 20. As would be understood, the various features and components of the row units 16 may be present in myriad configurations.

Continuing with FIGS. 3A-3B, exemplary implementations of the system 10 in certain implementations can operate with a variable rate planting system 25 having a seed tube 25A and seed meter 25B, wherein the seed meter 25B can operate to quickly and easily adjust the seed cell position, geometry, number of the seed meter seed cells in real-time, including in the middle of the field without having to stop, such as SeedCommand®/SureDrive® or other products known in the art. It is appreciated that various of these variable rate changes are made via hydraulically or electronically altering the RPM of the seed meter 25B.

Exemplary implementations of the system 10 also include a soil sensor 30, such as an organic matter soil sensor 30. The soil sensor 30 may be an optical sensor or other sensor type as would be known and appreciated by those of skill in the art. In some implementations, the soil sensor 30 is disposed on the tractor 12, as shown in FIG. 1. In alternative implementations, the soil sensor 30 is disposed on the planter 14, as shown in FIG. 2.

In exemplary implementations, the soil sensor 30 is disposed on one or more of the row units 16, shown for example in FIGS. 3A-3B, such that the soil sensor 30 is able to take readings of organic matter in the opened trench 2. In various of these implementations, the soil sensor 30 is placed adjacent to the seed tube 25A, as would be readily appreciated.

The soil sensor 30 according to these and other implementations is in communication with a processor 32. In some implementations, the processor 32 is in direct and/or indirect wired or wireless communication with storage and/or computing media 40. As shown in FIG. 1, the storage 40 may be accessed via a cloud platform 34 or server 34 and/or storage 40 can be achieved locally, such as with an on-board storage medium other or database 40. Various alternative storage and computing media would be known and recognized by those of skill in the art. The storage media 34/40, processor 32, and/or soil sensor 30 are in direct and/or indirect wired or wireless communication with a display 36 or displays 36 (described elsewhere herein in reference to a single display 36).

In certain implementations, the display 36 is disposed within a tractor 12 for use during planting operations. In various alternative implementations, the display 36 is remote of the tractor 12 and is controlled and operated off-site during planting operations. In still further implementations, the display 36 is portable and is constructed and arranged to operate both from within the tractor 12 and outside of the tractor 12. A display 36 may be used in both planting and harvesting operations, as would be readily appreciated by those of skill in the art. According to certain implementations, the display 36A may be a secondary display 36A, or may also be a mobile device such as an iPad® or other mobile device 36A, and in certain implementations an ISOBUS Universal Terminal (shown in FIG. 1 at 38) is further provided such that various components of the system 10 from the OEM or other manufacturers are able to communicate with the system 10 processors 32, displays 36 and the like.

In these and other implementations, the display 36 can display the seeding rate and the organic matter readings to the user/operator in real time. It is understood that various factors can affect the ideal seeding rate and/or other planting parameters. These factors may include the amount of organic matter in the soil, historic yield, terrain characteristics, geo-spatial data, and various additional factors as would be recognized by those of skill in the art. Utilizing variable rate seeding can result in high yields while minimizing waste, ultimately increasing profits.

However, previous attempts at using organic matter have resulted in inconsistent results. The implementations of the system 10 disclosed herein improve the performance of variable rate seeding applications by weighing organic matter readings with other augmented data to establish a weighted yield potential reading that can, in turn, be used to prescribe a specified seeding, hybrid selection and/or soil treatment amount.

Figure 4A:
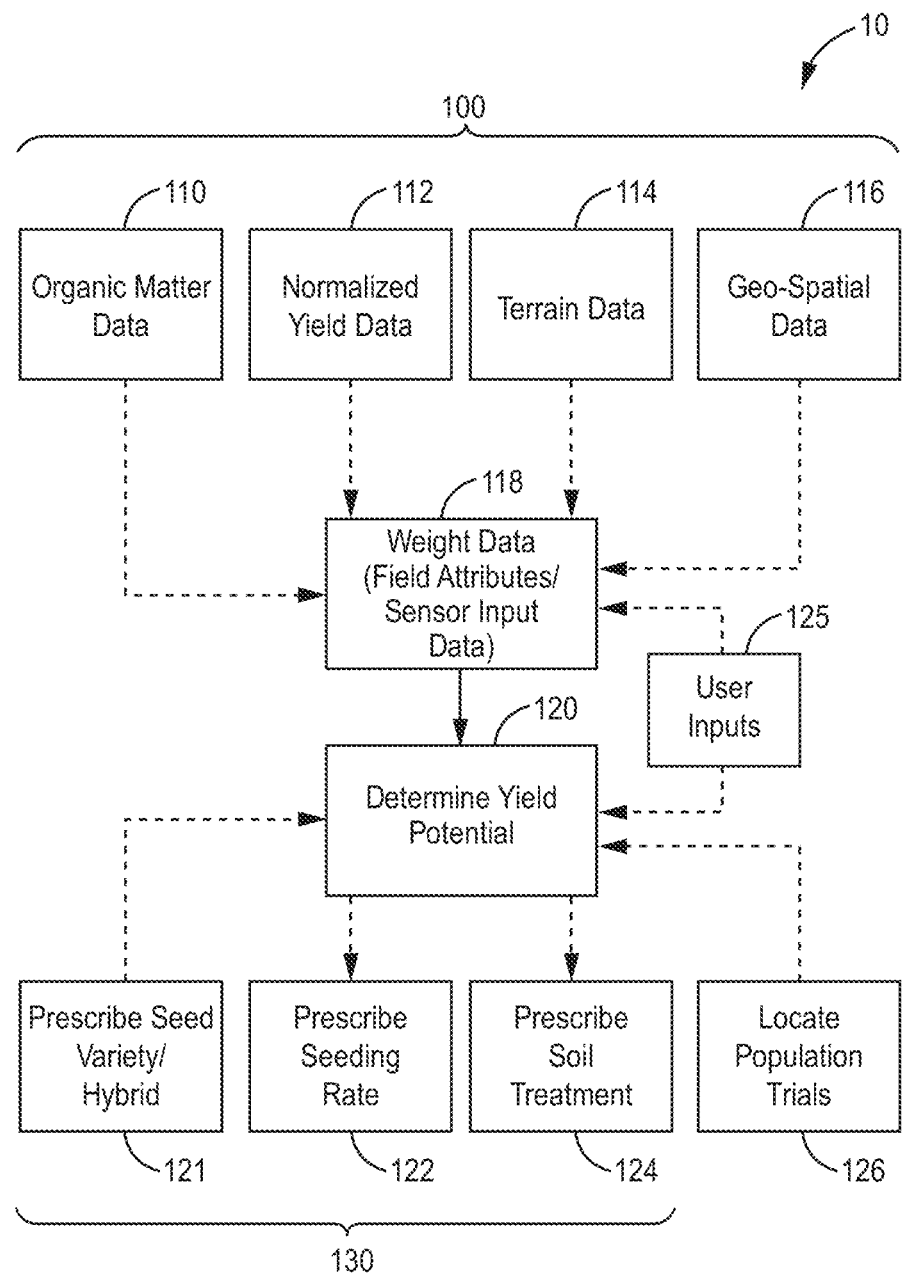
FIG. 4A is a flow chart showing various optional steps of the system in use, according to an exemplary implementation of the system.

Returning to the drawings, in implementations like that of FIG. 4A, the system 10 is constructed and arranged to collect and weight two or more field attribute data types 100 to determine yield potential (box 120). In the implementation of FIG. 4A, the field attribute data 100 includes organic matter data (box 110) that is weighed with one or more additional augmenting field attribute data 100, such as normalized yield data (box 112), terrain data (box 114), geo-spatial data (box 116) and/or user input data (box 125). In alternate implementations, organic matter data (box 110) is not collected, but two or more of the other field attribute data types (boxes 112-116 and 125) are weighted (box 118).

Continuing with the implementations of FIG. 4A, the system 10 weights (box 118) the two or more field attribute data inputs (boxes 110-116 and 125) in order to determine the yield potential (box 120) on-the-go and prescribe an output 130, such as one or more of the seed variety (box 121), the variable rate seeding rate (box 122), a soil treatment (box 124) and/or other treatment parameters according to the determined yield potential (box 120).

That is, the system 10 according to these implementations is constructed and arranged to augment a first field attribute data 100, such as organic matter data (box 110), with another layer of field attribute data via a variety of optional steps, such that the system 10 can prescribe 130 a planting/treatment (boxes 121-124) so as to maximize the actual yield of an area is by adjusting the seeding rate, hybrid selection and/or soil treatment rate in real time.

More specifically, the system 10 according to the implementation of FIG. 4A is constructed and arranged to collect organic matter data (box 110) from a soil sensor 30 mounted on the row unit (such as is shown in FIGS. 3A-3B) and augment that organic matter data with one or more of various additional field attribute data 100 sources (boxes 112-116). The additional field attribute data sources shown in FIG. 4A include normalized yield data (box 112), terrain data (box 114) and geo-spatial data (box 116), though there are others that would be readily appreciated by those of skill in the art, such as historical data. In further implementations, the additional field attribute data sources may be in the form of spatial data layers.

In use according to one such implementation, in an optional field attribute data step, the system 10 collects/utilizes organic matter data (box 110) from the soil sensor 30. In another optional field attribute data step, the system 10 collects/utilizes normalized yield data or other yield data (box 112). In a further optional field attribute data step, the system 10 collects/utilizes terrain data (box 114), such as elevation data. In another optional field attribute data step, the system 10 collects/utilizes geo-spatial data (box 116). In a further optional field attribute data step, the system 10 collects/utilizes user inputs (box 125). In various implementations, the organic matter data (box 110) or any of the other optional augmenting field attribute data steps are omitted. It is readily appreciated that the collection/utilization each of the optional steps described herein can be performed in any order.

In use according to the implementation of FIGS. 4A-4D, the collected field attribute data, such as optional organic matter data (box 110) and normalized yield data (box 112) are weighed (box 118) by the system 10 to determine yield potential (box 120). In various implementations, both the weighting (box 118) and the determination of yield potential (box 120) are done on the basis of user-inputted weighing values, while in other implementations the weighing is done via an artificial intelligence or machine learning protocol, as discussed in relation to FIG. 7.

Continuing with the implementation of FIG. 4A, these data inputs may be replicated and displayed on the display 36. In various implementations, the various data inputs are displayed on the display 36 during planting operations. In these implementations, an algorithm executed on the processor 32 processes the various field attribute data inputs. That is, the processor 32 executes one or more algorithms to augment the organic matter data with the various other desired data inputs. In further implementations, the system algorithm(s) determine the yield potential for the soil being planted in real time for display 36.

Following the determination of the yield potential (box 120), the system 10 prescribes 130 one or more actions, such as the seed variety (box 121), the seeding rate (box 122) and/or any soil treatments (box 124).

As shown in FIGS. 4B-4D, in various implementations, the system 10 is constructed and arranged to weight (box 118 in FIG. 4A) two or more types of field attribute data. In various of these implementations, the system 10 applies various weighting zones to the utilized field attribute data types.

In the example of FIG. 4B, the system 10 assigns an area having an organic matter ("OM") percentage between 0 and 1%, a normalized yield between 0 and 80% or a terrain analysis of depression a yield potential value of 1. In this specific example, the seeding rate for yield potential 1 is 28,000 seeds/acre, as is shown in FIG. 4D. It is appreciated that these yield potential values represent values for an area based on a single field attribute data type, prior to weighting, as described herein.

In another example, the system 10 defines assigns an area with an OM % between 1 and 2%, a normalized yield between 70 and 100%, or the terrain analysis is of ridge as yield potential value 2. As shown in FIG. 4B, additional attributes (1 and N) can also be included categorized (box 118 in FIG. 4A).

In the implementation of FIGS. 4B-D, yield potential value 3 is assign by any of OM %: 3-4%, normalized yield: 100-110% or terrain: plain, seeding rate: 36,000. Yield potential value 4 is characterized by OM %: 4+%, normalized yield 100+% or terrain: side slope, for a seeding rate of 40,000.

Critically, and as will be readily appreciated and as shown in FIG. 4C, any given specific area of the field (Area 1) can have multiple field attributes and data that fall into several yield potential values. For example, taking several different field attribute data points together, an area may have an OM % yield potential value of 3, a normalized yield value of 4, a terrain value of 4, and two other field attribute data values of 2 (shown at "Attribute 1" and "Attribute N"—it is understood that these are included for illustrative purposes and can represent any types of field attribute data that are to be included).

In these implementations, the system 10 according to certain implementations assigns different weights W to these different field attribute data inputs or parameters to determine weighted attribute scores, shown in FIGS. 4B-4C at X. The weights W may be adjusted manually or automatically by the system 10 and/or user, as would be appreciated.

As shown in FIG. 4C, as a result of the weighs W, the weighted attribute scores X can be tabulated to calculate a weighted yield potential Y, which is directly correlated to the on-the-go yield potential (box 120 in FIG. 4A). As shown in FIG. 4D, the weighted yield potential Y (3.5625 out of a possible 4) can then be prescribed via the output table to determine an on-the-go augmented seeding rate Z: 38,250 seeds/acre. It is readily appreciated that any of the other prescribed outputs 130 of FIG. 4A or those understood in the art can be determined in the same way.

In a further implementation, the system 10 is constructed and arranged to include or exclude field attribute data types during use. In various alternative implementations, one or more field attribute data types may not be measured and or included in the system 10 processing. In some implementations, a user may manually choose to exclude or include a specific field attribute data type, such as by temporarily suspending or activating the field attribute data, such as through the display 36. In various alternative implementations, the system 10 may automatically exclude or include a field attribute data type, such as by detecting a malfunctioning sensor and excluding the field attribute data type measured by that sensor. Many other examples will be readily appreciated by the skilled artisan.

Normalized Yield Data

Turning to the various optional field attribute data types in detail, in certain implementations, the system 10 augments organic matter data (box 110) with normalized yield data (box 112). In some implementations, normalized yield data is historical yield data for the field over multiple years, which has been normalized into one data set. As would be appreciated, historical yield data can be an indicator of future yield potential.

Figure 5:
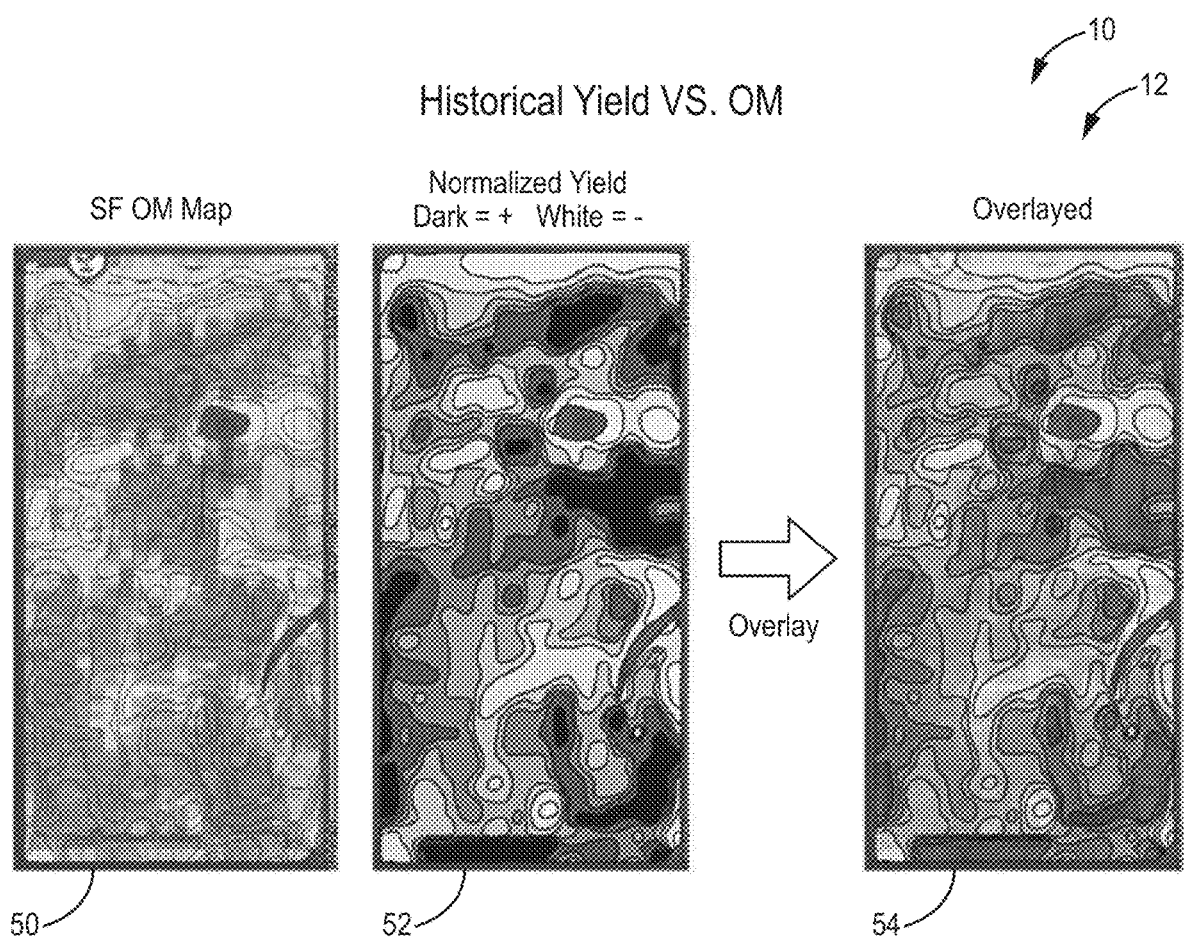
FIG. 5 is a rendered depiction of an overlay map, according to an exemplary implementation of the system.

FIG. 5 shows an exemplary organic matter map 50 and a corresponding normalized yield map 52. In various implementations, the system 10 is constructed and arranged to augment the organic matter map 50 with the normalized yield map 52 (box 112 of FIG. 4A) and created an overlaid map 54. It is appreciated that in the organic matter map 50, lighter areas indicate high organic matter content while darker areas indicate lower organic matter content. In the normalized yield map 52, the darker area indicate higher yields while lighter areas indicate lower yields. As can be seen by comparing the maps 50, 52 the amount of organic matter does not always directly correlate to the yield value (where it is generally understood that higher organic matter indicates a higher yield). As would be readily appreciated, alternate implementations are of course possible.

As would be further appreciated, another factor impacting yield can be weather. Including and weighting historical yield data, reflected in the normalized yield map 52, takes into account year-to-year weather variability. As such, in various implementations, the system 10 can use the normalized yield data to determine the yield potential of various areas of the field.

Terrain Data

In various implementations, the system 10 augments the organic matter data with terrain data (box 114). In some implementations, terrain data includes elevation data. In further implementations, the terrain data includes other terrain analysis such as soil type, drainage intensity, landscape position (depression, valley, side slope, ridge, plain), slope, grade, wetness potential. In some implementations, terrain data may be utilized by the system 10 to recognize areas of field or terrain that are prone to ponding or poor draining leading to chronic wetness. In these implementations, augmenting organic matter data with terrain data (box 114) allows the system 10 to prescribe a seeding rate that corresponds to the yield potential of the soil. In further implementation, the system 10 can prescribe or alter other planting parameters corresponding to the yield potential of the soil.

In various implementations, the augmenting the soil sensor data with terrain data prevents the system 10 from incorrectly identifying chronically wet areas as high yield zones, despite the presence of high organic matter. For example, organic matter data when augmented with terrain data (box 114) may allow the system 10 to recognize areas that have high organic matter content—indicative of high yield potential—but are chronically wet and/or drain poorly such that the yield potential is lower.

The system 10 may evaluate and detect terrain characteristics via a variety of techniques. In some implementations, the system 10 uses a prerecorded spatial map of elevation and/or slope. In certain implementations, the system 10 uses a tilt or inertial sensor affixed to the tractor 12, planter 14, and/or row units 16 during planting operations. In some implementations, the measured tilt of the tractor 12, planter 14 and/or row unit 16 is correlated to the terrain slope. In further implementations, the system 10 includes a GPS system. In some implementations, the GPS system is affixed to the tractor 12, planter 14, or row unit 16 and terrain slope is calculated using the change in GPS elevation along the tractor 12, planter 14, or row unit 16 path.

In some implementations, a combination of techniques for determining terrain data are used. In one implementation, the system 10 uses both a GPS system and an inertial sensor on the tractor 12 and/or planter 14. In these implementations, the system 10 utilizes GPS elevation data and a tilt or inertial sensor in combination to determine where the system 10 is located in a field—on the top of a hill, on the side slope, in a depression at the bottom of the hill or the like. Of course, other techniques for measuring terrain characteristics are possible and would be recognized by those of skill in the art.

Figure 6:
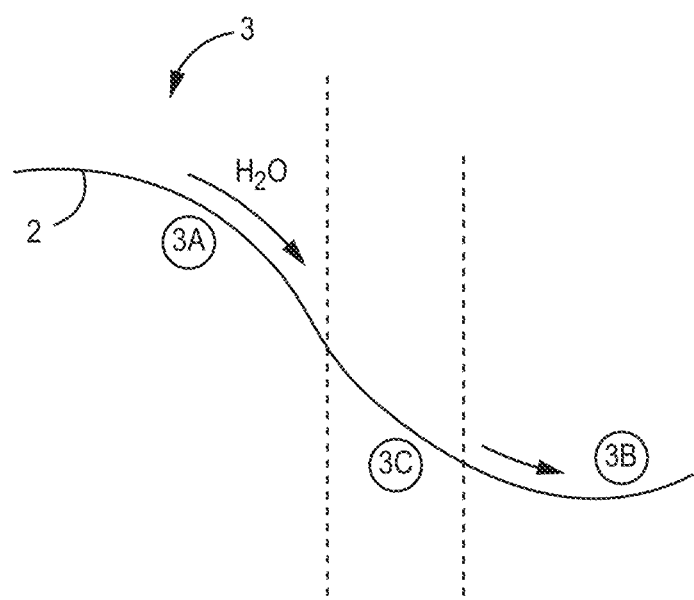
FIG. 6 is a graphical representation of the value of weighting field attribute data via certain implementations of the system.

By way of example, FIG. 6 shows a side view of an exemplary hill 3 or field area with varying elevation. In this example, at the top of the hill 3A, the system 10 detects the higher elevation and a low level of organic matter. As a tractor 12 or planter 14 traverses the hill 3 the system 10 detects the changes in elevation and organic matter content. For example, the bottom of the hill 3B has a lower elevation and higher level of organic matter than the top of the hill 3A. When the organic matter data is viewed on its own the bottom of the hill 3B has the highest yield potential due to its high level of organic matter. But the system 10 is constructed and arranged to overlay the organic matter data with the terrain data (box 114 of FIG. 4A)—here elevation data—to recognize area 3B as being the bottom of a hill that is prone to pooling water and/or ponding thereby decreasing the yield potential for area 3B.

In the example of FIG. 6, the area 3C just above the bottom of the hill 3B and downhill of the top of the hill 3A has a medium organic matter level and a favorable slope for water flow, and therefore has the highest yield potential. As would be recognized by those of skill in the art, despite having a lower level of organic matter than the bottom of the hill 3B, the field at area 3C does not have the ponding/pooling issue that the bottom of the hill 3B has, and therefore has a greater yield potential, and so it is preferable to prescribe yield-improving outputs to that area 3C.

Continuing with the illustrative example of FIG. 6, the top of the hill 3A does not have the pooling or ponding issues that the bottom on the hill 3B has because water flows downhill. Yet, due to the steeper slope of the hill the top soil may erode away or flow downhill thereby decreasing the amount of organic matter in the soil, which decreases the yield potential of the area 3A.

Geo-Spatial Data

Turning back to FIG. 4A, in various implementations, the system 10 utilizes geo-spatial data (box 116) as one of the two or more field attribute datum. In various implementations, this geo-spatial data may include the location of field drainage tile lines and other physical characteristics well understood in the art. The system 10 augmenting the organic matter data with such geo-spatial data (box 116) may indicate area of the field with higher or lower yield potentials. For example, areas close to the drainage tiles have a higher yield potential than areas farther away from the drainage tiles. As would be readily appreciated, such geo-spatial data may be integrated via a map overlay, as shown in relation to FIG. 5.

User Inputs

In various implementations, the system 10 augments the organic matter data with various user inputs (box 125). In some implementations, user inputs may include a user defined map of low and high yield potential areas. For example, a user may manually mark and/or otherwise identify yield potentials for various locations in a field.

Turning back to FIG. 4A, the system 10 according to certain implementations is constructed and arranged to weight (box 118) and determine yield potential (box 120) in real time. That is, the system 10 is constructed and arranged to use the field attribute data inputs (boxes 110-116) to determine the yield potential for the current location of the tractor 12, planter 14, row unit 16, or other implement in real time during planting operations.

In another optional step, the system 10 can use the yield potential (box 120) to prescribe a seeding rate (box 112) for that zone. In a further implementation, the system 10 automatically adjusts the seeding rate to the prescribed seeding rate in real time, as has been previously described. In further implementations, the system 10 alerts a user to the prescribed seeding rate and the user may then manually adjust the seeding rate.

In a further optional step, the system 10 can prescribe a soil treatment (box 124) or other adjustment to planting parameters based on either or both of the yield potential (120) and the prescribed seeding rate (box 122). As noted above, adjustments or changes may be made manually or automatically be the system 10. That is, the algorithm may establish correlated relationships between selected hybrid (box 121) and the seeding rate (box 122). For example, for a yield potential of 3.5 or higher, a specific hybrid may be selected, while an alternate hybrid is selected for yield potentials below 3.5, and the seeding rates (box 122) and/or treatment regimens (box 124) may vary depending on the selected hybrid. While this example presumes dependency on the selected hybrid, the relationship between the various selections/rates can be independent or operate in alternate order, such that the seeding rate (box 122) can be used in prescribing the hybrid (box 121) and treatment (box 124), or the treatment (box 124) can be used in prescribing the seeding rate (box 122) and hybrid (box 121). Many examples are of course possible and would be readily appreciated by those of skill in the art.

In a still further optional step, the system 10 can use the yield potential (box 120), prescribed hybrid (box 121), prescribed seeding rate (box 122), and/or prescribed soil treatments (box 124) to select and locate population trials (box 126). That is the system 10 can automatically determine where to locate a population trial (box 126) based on the various inputs to the system 10 shown in boxes 110-116). For example, the system 10 may determine that a specified area or zone has a highly consistent (or inconsistent) yield potential, and determine that area zone is thus suitable for a population trial.

As would be understood, population trials are areas, often small areas, in a field where different seeding rates are planted and analyzed during harvest for yield and/or other parameters of interest. In some implementations, these population trials are replicated in each zone of the field.

In some of these implementations, the system 10 stores the locations of the population trials in the storage media 34. During harvest the storage media 34 can be accessed and the population trial areas can be displayed on the display 36. In various of these implementations, during harvest the yield for each population trial can be checked. In some implementations, the system 10 is constructed and arranged to compare the harvest yields of the various population trials to determine the best seeding rate and/or treatment parameters for each zone.

In certain implementations, the system 10 can display the population trial yield information to a user during planting, harvesting, or any other time such that adjustments in seeding rates, treatments, seed type, and/or other parameters can be made during subsequent plantings and growing seasons.

Figure 7:
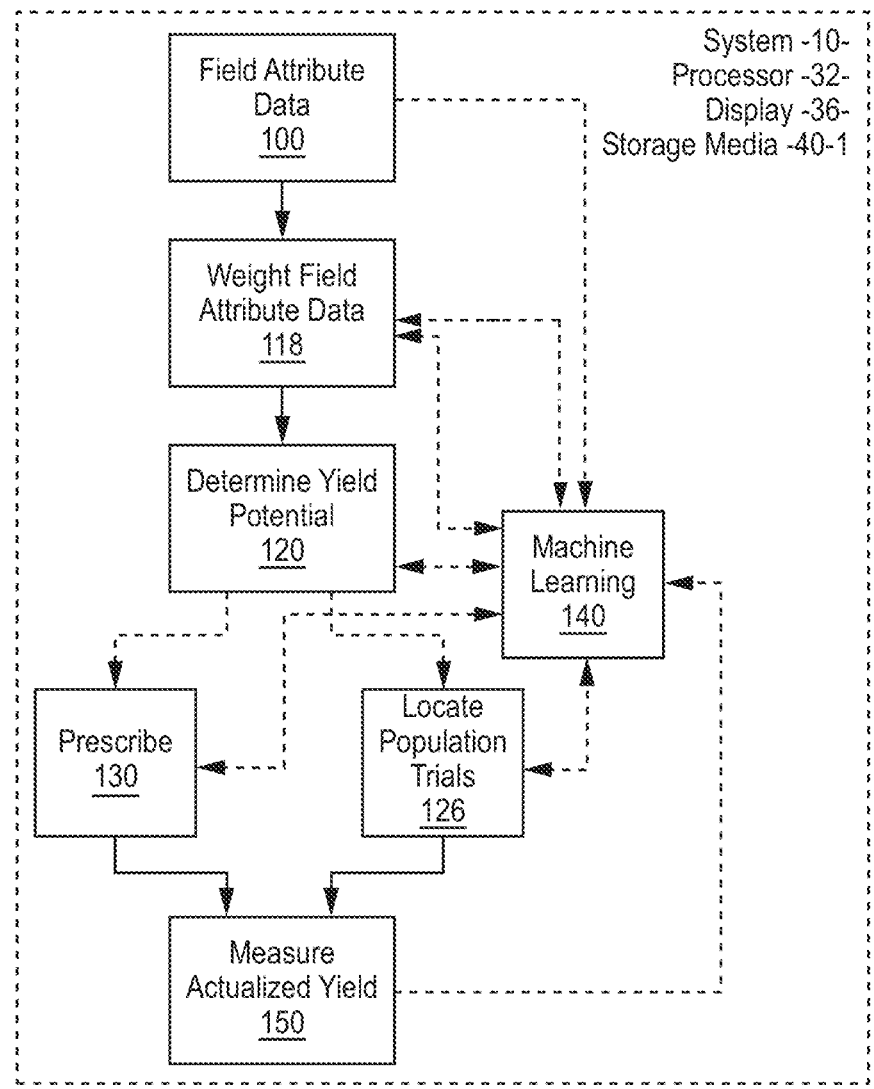
FIG. 7 is a flow chart showing the system having machine learning, according to an exemplary implementation of the system.

As shown in FIG. 7, certain implementations of the system 10 feature machine learning that comprise the implementation of a variety of optional steps. In these implementations, the system 10 processor 32 is in electrical communication with a storage medium, such as a database 40 and, optionally, a display 36, components through which the system 10 is constructed and arranged to execute a variety of optional machine learning algorithm steps (shown generally at box 140).

In implementations like that of FIG. 7, the system 10 (via the processor 32 and storage 40) is optionally constructed and arranged to store field attribute data (box 100) for individual locations, optionally so as to be combined with actualized yield data (box 150) recorded by the harvester so as to perform pattern recognition, artificial intelligence, neural net technology, and/or machine learning to establish yield potential performance thresholds and predict future yield potentials and/or weighting parameters for use in subsequent planting cycles. The machine learning data may in turn be stored for access by the processor 32 and subsequently be optionally used to, for example, optionally alter the weighting of the field attributes (box 118), optionally calculate of yield potentials (box 120), and/or optionally revise the prescribed outputs (box 130) for defined yield potentials, that is, adjust stored tables like those shown in FIGS. 4B-4D. Additional implementations also monitor additional parameters such as historical weather data and the like for the application of statistical analysis, machine-learning and the like.

Further implementations of the system featuring machine learning are constructed and arranged to store the locations of the population trials (box 126) in the storage media 40. During harvest, the storage media 40 can be accessed and actualized yield harvest data (box 150) for the population trials (box 126) are compared with at least one of the field attribute data (box 100), the weighted field attribute data (box 118), the determined yield potential (box 120), the prescribed outputs (box 130) and/or other factors such as user inputs (not shown) and the like. In various of these implementations, during harvest the yield for each population trial can be analyzed via machine learning (box 140) to optimize the various components of the system 10. In some implementations, the system 10 is thereby constructed and arranged to compare the actualized harvest yields of the various location trials to determine the best prescribed outputs. Further implementations of the machine learning processes are of course possible and would be readily appreciated by those of skill in the art.

It is further appreciated by those of skill in the art that in implementations featuring machine learning and those without, the system 10 may display one or more of the calculated yield potential and/or prescribed rate/hybrid/treatment in the display 36 to be used during harvesting to compare calculated yield potential (box 120) to actualized yield (box 150). It is appreciated that in use according to these implementations, the user is thereby able to visualize which field attributes (box 100) have the largest impact on actualized yield in the specific field, such that the user can adjust the various weightings either manually or with the aid of machine learning. Further combinations and implementations are of course possible.

Although the disclosure has been described with references to various embodiments, persons skilled in the art will recognized that changes may be made in form and detail without departing from the spirit and scope of this disclosure.

What is claimed is:

1. A variable rate on-the-go prescription planting system for use with a seed meter having a seeding rate, comprising:
   a) a soil sensor constructed and arranged to record soil organic matter data; and
   b) a processor constructed and arranged to weight the recorded soil organic matter data with terrain data,
   wherein the processor is constructed and arranged to prescribe the seed meter seeding rate in response to the weighted soil organic matter data and terrain data.

2. The system of claim 1, wherein the processor is further constructed and arranged to determine a yield potential.

3. The system of claim 1, wherein the processor weights on the basis of user inputs.

4. The system of claim 1, wherein the terrain data is one or more of elevation data, soil type, drainage intensity, landscape positions, slope, grade, and wetness potential.

5. The system of claim 1, wherein the processor is constructed and arranged to prescribe a seed variety/hybrid or a soil treatment.

6. The system of claim 1, wherein the processor is in operational communication with a database.

7. The system of claim 1, further comprising:
   a) an ISOBUS Universal Terminal; and
   b) a display that is optionally a mobile device.

8. The system of claim 7, wherein the processor is constructed and arranged to overlap maps on the display.

9. The variable rate on-the-go prescription planting system of claim 8, wherein the terrain data is one or more of elevation data, soil type, drainage intensity, landscape positions, slope, grade, and wetness potential.

10. The variable rate on-the-go prescription planting system of claim 9, wherein the processor is constructed and arranged to calculate a weighted yield potential from the weighted yield attribute scores.

11. A variable rate on-the-go prescription planting system for use with a row unit, comprising a processor constructed and arranged to:
   i) weight two or more field attribute data types, comprising:
      (i) organic matter data and
      (ii) terrain data;
   ii) determine yield potential based on the weighted field attribute data; and
   iii) prescribe at least one of seed variety/hybrid, seeding rate and soil treatment to be applied by the row unit.

12. The variable rate on-the-go prescription planting system of claim 11, wherein the processor is constructed and arranged to determine weighted yield attribute scores.

13. The variable rate on-the-go prescription planting system of claim 12, wherein the processor is constructed and arranged to prescribe the output via the weighted yield potential.

14. The variable rate on-the-go prescription planting system of claim 11, further comprising a display, wherein the processor is further constructed and arranged to generate overlay maps on the display.

15. The variable rate on-the-go prescription planting system of claim 11, processor is constructed and arranged to locate population trials.

16. The variable rate on-the-go prescription planting system of claim 11, further comprising storage media, wherein the processor is constructed and arranged to adjust weighting via machine learning.

17. A variable rate on-the-go prescription planting system for use with a planting row unit comprising a seed meter and a processor
   wherein the processor is constructed and arranged to:
   i) input field attribute data comprising:
      (A) organic matter data;
      (B) terrain data; and
      (C) one or more of normalized yield data, and geo-spatial data;
   ii) weight the field attribute data; and
   iii) prescribe at least one of:
      A) seed variety/hybrid,
      B) seeding rate, and/or
      C) soil treatment
      to be applied by the row unit.

18. The variable rate on-the-go prescription planting system of claim 17, wherein the processor is further constructed and arranged to determine yield potential.

19. The variable rate on-the-go prescription planting system of claim 18, further comprising storage media, wherein the processor is constructed and arranged to optimize weighting via machine learning.

20. The variable rate on-the-go prescription planting system of claim 19, wherein the processor and storage are constructed and arranged to compare actualized yield with the determined yield potential.

21. The variable rate on-the-go prescription planting system of claim 20, further comprising at least one display and an ISOBUS Universal Terminal.

* * * * *